United States Patent
Fauvel et al.

(10) Patent No.: US 8,335,602 B2
(45) Date of Patent: Dec. 18, 2012

(54) SYSTEM AND METHOD FOR CONTROLLING A HYBRID POWER PROPULSION UNIT FOR A PERMANENT FOUR WHEEL DRIVE MODE OPERATION

(75) Inventors: Francois Fauvel, Boullay les Troux (FR); Tariq Ouaguenouni, Sceaux (FR); Frederic Roudeau, Vitry sur Seine (FR)

(73) Assignee: Renault S.A.S., Boulogne Billancourt (FR)

( * ) Notice: Subject to any disclaimer, the term of this patent is extended or adjusted under 35 U.S.C. 154(b) by 511 days.

(21) Appl. No.: 12/523,258

(22) PCT Filed: Jan. 7, 2008

(86) PCT No.: PCT/FR2008/050015
§ 371 (c)(1),
(2), (4) Date: Dec. 31, 2009

(87) PCT Pub. No.: WO2008/102088
PCT Pub. Date: Aug. 28, 2008

(65) Prior Publication Data
US 2010/0106354 A1    Apr. 29, 2010

(30) Foreign Application Priority Data
Jan. 19, 2007   (FR) .................................... 07 52771

(51) Int. Cl.
*B60K 17/34*   (2006.01)
*B60K 6/20*    (2007.10)
*B60K 6/52*    (2007.10)
*B60W 10/06*   (2006.01)
*B60W 10/08*   (2006.01)
*B60W 20/00*   (2006.01)

(52) U.S. Cl. ........ 701/22; 180/233; 180/247; 180/65.21; 180/65.28; 180/65.285; 701/69; 701/89; 701/90

(58) Field of Classification Search .................. 180/165, 180/65.21, 65.27, 65.28, 65.285, 233, 247; 318/432, 433; 701/22, 69, 84, 89, 90, 123; 903/916
See application file for complete search history.

(56) References Cited

U.S. PATENT DOCUMENTS

| | | | |
|---|---|---|---|
| 5,562,566 A * | 10/1996 | Yang | 477/3 |
| 6,205,379 B1 | 3/2001 | Morisawa et al. | |
| 6,434,469 B1 * | 8/2002 | Shimizu et al. | 701/84 |
| 6,442,454 B1 * | 8/2002 | Akiba et al. | 701/22 |
| 6,479,906 B2 * | 11/2002 | Uchida | 290/40 C |

(Continued)

FOREIGN PATENT DOCUMENTS
EP    1 393 951    3/2004

*Primary Examiner* — Paul N Dickson
*Assistant Examiner* — Laura Freedman
(74) *Attorney, Agent, or Firm* — Oblon, Spivak, McClelland, Maier & Neustadt, L.L.P.

(57) ABSTRACT

A system for controlling a power propulsion unit of a hybrid type for a four-wheel-drive automotive vehicle that includes at least one electric motor part and at least one thermal engine part capable of driving the independent front and rear driving axles of the vehicle. The system includes a mechanism determining total torque set point from a request of the driver, a mechanism distributing the total torque set point, and a system optimizing the duty point, to dynamically determine the torques to be applied to each of the two driving axles and to optimize fuel consumption of the power propulsion group according to the drivability requested by the driver and driving conditions.

10 Claims, 1 Drawing Sheet

U.S. PATENT DOCUMENTS

| | | |
|---|---|---|
| 6,528,959 B2 * | 3/2003 | Kitano et al. .................. 318/55 |
| 6,549,840 B1 * | 4/2003 | Mikami et al. .................. 701/69 |
| 6,729,426 B2 * | 5/2004 | Suzuki .......................... 180/197 |
| 7,004,018 B2 * | 2/2006 | Kadota et al. ............. 73/115.02 |
| 7,163,480 B2 * | 1/2007 | Supina et al. ..................... 475/5 |
| 7,428,457 B2 * | 9/2008 | Stroh .............................. 701/51 |
| 7,634,338 B2 * | 12/2009 | Kaltenbach et al. ............ 701/41 |
| 7,774,108 B2 * | 8/2010 | Nakasako et al. .............. 701/22 |
| 2002/0087252 A1 | 7/2002 | Shimizu et al. |
| 2004/0040375 A1 | 3/2004 | Kadota et al. |
| 2006/0076915 A1 | 4/2006 | Kaltenbach et al. |
| 2011/0130909 A1 * | 6/2011 | Claeys et al. ................... 701/22 |

* cited by examiner

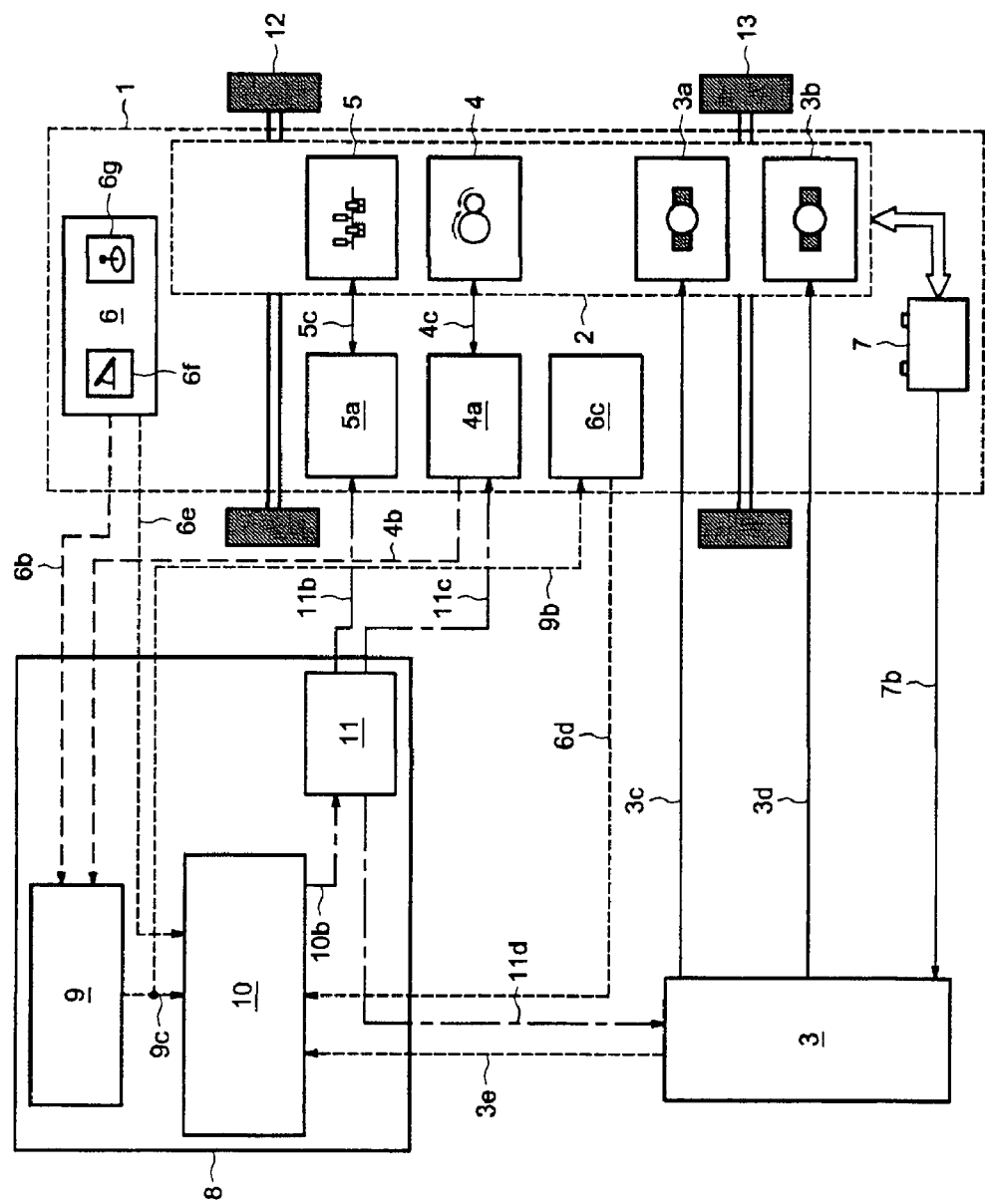

SYSTEM AND METHOD FOR CONTROLLING A HYBRID POWER PROPULSION UNIT FOR A PERMANENT FOUR WHEEL DRIVE MODE OPERATION

The present invention relates to a system for controlling a hybrid power propulsion unit for a four-wheel drive motor vehicle that can combine a permanent four-wheel drive mode and a reduction in fuel consumption.

The increase in oil prices has made reducing the fuel consumption of motor vehicles both necessary and economically viable. The techniques associated with reducing fuel consumption have first of all been applied to vehicles liable to affect a large number of people, generally motor vehicles of the saloon or citycar type. Faced with the anticipated tightening of legislation covering vehicles with a high stated fuel consumption, particularly covering so-called four-wheel drive vehicles, it has become attractive to allow these vehicles to enjoy fuel consumption and pollution reducing techniques such as hybrid propulsion. However, very little research has been conducted into how to reconcile a reduction in fuel consumption with control over the drive of a permanent four-wheel drive vehicle.

Patent application FR2654682 discloses the operation of a four-wheel drive vehicle equipped with a conventional thermal power plant. That application describes the members and methods of splitting the driving torque between the two driven axle assemblies. However, hybrid propulsion appears not to have been taken into consideration. It is therefore not possible to optimize the operating point of the power propulsion unit in order to reduce fuel consumption.

Patent application FR2827339 discloses a hybrid power propulsion unit control system comprising means of optimizing the operating point of the power propulsion unit and means of dynamically saturating the setpoint demanded by the driver. However, no mention is made of a distinction between torque imposed on the front axle assembly and torque imposed on the rear axle assembly. It is therefore impossible to take into consideration a torque setpoint imposed on the rear axle assembly in the context of a four-wheel drive mode of operation.

U.S. Pat. No. 6,205,379 describes a system of controlling a hybrid power propulsion unit for a motor vehicle comprising two driven axle assemblies. This control system notably incorporates strategies for governing electric propulsion under situations of low grip and/or situations of steep slope. These strategies correspond to specific applications of a four-wheel drive mode. No mention is made of consideration being given to a permanent four-wheel drive mode demanded by the driver. Nor is any mention made of any dynamic saturating of the rear axle assembly setpoints.

Patent application FR2799417 describes a system for controlling a vehicle comprising four-wheel drive and at least one power source for each of the two, one front and one rear, axle assemblies. No mention whatever is made of a system for dynamically saturating the setpoints or of any consideration given to a permanent four-wheel drive mode demanded by the driver.

Patent application JP2001171378 describes a system for controlling a four-wheel drive vehicle allowing the torque at the wheels to be managed using mapped characteristics that are functions of the state of the vehicle and the state of the road surface. Here again, no mention whatsoever is made of any system for dynamically saturating the setpoints or of any consideration given to a permanent four-wheel drive mode demanded by the driver.

It is an object of the invention to reduce the fuel consumption while at the same time retaining the possibility of operating in permanent four-wheel drive mode.

It is another object of the invention dynamically to take account of the driving conditions when determining the various operating parameters.

In one embodiment, a system for controlling a power propulsion unit of the hybrid type for a four-wheel drive motor vehicle, comprises at least one electric motor member and at least one combustion engine member, capable of driving the independent front and rear driven axles of the vehicle. The control system comprises a determining means for determining the total torque setpoint on the basis of the demands of the driver, a splitting means for splitting the total torque setpoint and an optimizing means for optimizing the operating point. This system is able to dynamically determine the torques to be applied to each of the two driven axles and to optimize the operation of the power propulsion unit according to the drive demanded by the driver and the driving conditions.

The control system is capable first of all of determining the total torque setpoint that corresponds to the demand by the driver. This setpoint is then split into torque setpoints for the front and rear axle assemblies. This breakdown takes account of the parameters and of the state of the electrical system and of the driving conditions. What driving conditions means is the grip, the slope, and any parameter that the vehicle can detect and that has an influence on its behavior. The breakdown also takes account of the presence of a request from the driver for permanent four-wheel drive mode. In this case, a rear torque setpoint is imposed, reducing the total torque split options. Finally, this pair of torque setpoints for the rear and front axle assemblies is translated into power propulsion unit operating setpoints and optimized to reduce the fuel consumption of the vehicle and its pollutant emissions.

It is interesting to note that the presence of a torque setpoint imposed on the rear axle assembly at the time of the breakdown, carries with it a reduction in the number of power propulsion unit operating states. The optimization that takes place before the operating setpoints are transmitted is therefore limited to the available states, giving rise to lesser efficiency in terms of reducing the fuel consumption if the permanent four-wheel drive mode is activated.

In one embodiment, the control system may comprise a gearbox, a gearbox control means, an interface between the driver and the vehicle, and a vehicle course and stability control means capable of imposing a rear torque setpoint as a function of drive demanded by the driver and of the driving conditions. The means of determining the total torque setpoint from the demands of the driver is connected by its inputs to the interface between the driver and the vehicle and to the gearbox control means, and by its outputs to the means of splitting the total torque setpoint and to the vehicle course and stability control means. The means of determining the total torque setpoint is capable of translating the wishes of the driver into total torque setpoint.

The control system may comprise an electric control means. In such a system, the means of splitting the total torque setpoint is connected by its inputs to the means of determining the total torque setpoint on the basis of the demands of the driver, to the electric control means and to the vehicle course and stability control means, and by its outputs to the means of optimizing the operating point. The means of splitting the total torque setpoint is capable of determining the split of total torque between the front and rear axle assemblies as a function of the torque and of the power which are available to the electric motor members and of the torque setpoint imposed on the rear axle assembly by the vehicle course and stability control means.

In a control system comprising a means of controlling the combustion engine member, the means of optimizing the operating point is connected to the means of splitting the torque setpoint and by its outputs to the electric control means, to the combustion engine member and vehicle course control means and to the gearbox control means. The means of optimizing the operating point is capable of determining the operating parameters of the various engine and motor members and the gearbox ratio.

Another aspect of the invention is a control method in which the gearbox ratio and the operating and torque setpoints for the engine and motor members are determined in such a way as to optimize the operation of the power propulsion unit according to whether the driver is demanding four-wheel drive operation or operation that minimizes fuel consumption.

In one embodiment, the operation of the power propulsion unit is optimized by maximizing the four-wheel drive performance at the expense of fuel consumption while at the same time respecting the total torque required by the driver, when the driver is demanding four-wheel drive operation maximizing drive performance.

In another embodiment, the operation of the power propulsion unit is optimized by minimizing fuel consumption at the expense of four-wheel drive performance while at the same time respecting the total torque required by the driver, when the driver is demanding operation that minimizes fuel consumption.

When the driver is demanding four-wheel drive operation a dynamically variable non-zero rear torque setpoint is imposed.

When the driver is demanding operation that minimizes fuel consumption a rear torque setpoint that optimizes fuel consumption is imposed.

What happens is that because the rear axle assembly is connected to the electric motor members, all the torque that can be transferred to the electric motor members reduces the torque that has to be provided by the combustion engine member by a corresponding amount. The fuel consumption can therefore be reduced.

Other objects, features and advantages of the invention will become apparent from reading the following description, given solely by way of nonlimiting example and made with reference to the attached drawing in which:

FIG. 1 schematically depicts the main elements of a system according to the invention, in which the gearbox, the electric motor members and combustion engine member are controlled as a function of the demands by the driver.

FIG. 1 depicts a control system for a hybrid power propulsion unit. A vehicle 1 comprises a power propulsion unit 2 comprising, in this exemplary embodiment and nonlimitingly, two electric motor members 3a and 3b, a gearbox 4 and a combustion engine member 5. The vehicle also comprises an interface 6 between the driver and the vehicle, a means 5a of controlling the combustion engine member 5, connected to the latter via the link 5c, a means 4a of controlling the gearbox 4, connected to the latter by the link 4c, a means 6c of controlling the course and stability of the vehicle, batteries 7, an independent front 12 and rear 13 driven axle assembly, each one comprising a pair of wheels, connected by an axle and coupled to the power propulsion unit by a distribution system, not depicted. The interface 6 between the driver and the vehicle comprises, amongst other things, the throttle pedal 6f and the gear lever 6g.

The electric control means 3 controls the two electric motor members 3a and 3b by virtue of the respective links 3c and 3d. The electric control means 3 also receives information from the battery 7 via the link 7b.

The power propulsion unit electronic control unit 8 comprises a means 9 of determining the total torque setpoint on the basis of the demands of the driver, a means 10 of splitting the total torque setpoint and a means 11 of optimizing the operating point.

The means 9 of determining the total torque setpoint receives on its inputs information from the gearbox control means 4a via the link 4b and signals from the interface 6 between the driver and the vehicle, via the link 6b. The means 9 of determining the total torque setpoint transmits a total torque setpoint corresponding to the demand of the driver to the means 10 of splitting the torque setpoint, via the link 9c and to the vehicle course and stability control means 6c via the link 9b.

The means 10 of splitting the torque setpoint receives, on its inputs, information from the means 9 via the link 9c, from the electric control means 3 transmitted via the link 3e, and from the vehicle course and stability control means 6c via the link 6d, and transmits signals via the link 10b to the means 11 of optimizing the operating point.

The means 11 of optimizing the operating point receives signals from the means 10 via the link 10b and transmits control signals to the electric control means 3 via the link 11d, to the gearbox 4 control means 4a via the link 11c and to the means 5a of controlling the combustion engine member 5 via the link 11b. The means 4a, 5a and 3 translate these signals into control signals that can be interpreted by the members 4, 5, 3a and 3b, respectively.

The driver issues a torque setpoint, via the throttle pedal 6f and the gear lever 6g, from the interface 6 between the driver and the vehicle, which setpoint is transmitted to the means 9 of determining the total torque setpoint. The means 9 determines the total torque setpoint corresponding to the demand of the driver taking the gear ratio into consideration. This setpoint is then transmitted to the means 10 of splitting the torque setpoint and to the vehicle course and stability control means 6c.

The vehicle course and stability control means 6c in return transmits to the means 10 of splitting the torque setpoint an imposed rear torque value if the driver has demanded permanent four-wheel drive mode. This value is determined dynamically according to the driving conditions. The means 10 of splitting the torque setpoint then determines the split of total torque between the front 12 and rear 13 axle assemblies taking information about the state of the electrical system into consideration. The front and rear torque setpoints thus determined are then transmitted to the means 11 of optimizing the operating point.

The means 11 of optimizing the operating point determines the operating parameters of the power propulsion unit 2 in order to optimize fuel consumption and reduce the pollutant emissions or to optimize drive performance, according to the wishes of the driver. The optimizing means 11 transmits the setpoints to the electric control means 3, to the gearbox control means 4a and to the combustion engine member control means 5a.

The invention as described here manages a hybrid power propulsion unit in terms of torque at the wheels. The same system and the same method could be used in terms of force at the wheels.

The invention claimed is:

1. A system for controlling a power propulsion unit of hybrid type for a four-wheel drive motor vehicle including at least one electric motor member and at least one combustion engine member, to drive independent front and rear driven axles of the vehicle, comprising:

determining means for determining a total torque setpoint based on demands of a driver, including a selection made between four-wheel drive operation and operation that minimizes fuel consumption;

vehicle course and stability control means for imposing a rear torque setpoint as a function of the demands of the driver and of driving conditions;

splitting means for splitting the total torque setpoint between the at least one electric motor member and the at least one combustion engine member, the splitting means imposing a dynamically variable non-zero rear torque setpoint when the four-wheel drive operation is demanded and imposing a rear torque setpoint that optimizes fuel consumption when the operation that minimizes fuel consumption is demanded; and optimizing means for optimizing an operating point of the power propulsion unit according to the demands by the driver and driving conditions.

2. The system as claimed in claim 1, further comprising:
a gearbox;
gearbox control means; and
an interface configured to be between the driver and the vehicle,
wherein the means for determining the total torque setpoint from the demands of the driver is connected by its inputs to the interface configured to be between the driver and the vehicle and to the gearbox control means, and by its outputs to the means for splitting the total torque setpoint and to the vehicle course and stability control means, the means for determining the total torque setpoint based on the demands of the driver by translating wishes of the driver into the total torque setpoint.

3. The system as claimed in claim 2, further comprising an electric control means, wherein the means for splitting the total torque setpoint is connected by its inputs to the means for determining the total torque setpoint based on the demands of the driver, to the electric control means and to the vehicle course and stability control means, and by its output to the means for optimizing the operating point, the means for splitting the total torque setpoint determining the split of total torque between the front and rear axle assemblies as a function of the torque and of the power available to the at least one electric motor member and of the torque setpoint imposed on the rear axle assembly by the vehicle course and stability control means.

4. The system as claimed in claim 3, further comprising means for controlling the combustion engine member, wherein the means for optimizing the operating point is connected by its input to the means for splitting the torque setpoint and by its outputs to the electric control means, to the combustion engine member control means and to the gearbox control means, and the means for optimizing the operating point determines control signals that control operation of the engine member and the at least one electric motor member and the gearbox ratio control signal.

5. The system as claimed in claim 1, wherein the driving conditions include grip of the vehicle and a slope on which the vehicle is traveling.

6. The system as claimed in claim 1, wherein the splitting means imposes a non-zero rear torque setpoint to optimize fuel consumption when the operation that minimizes fuel consumption is demanded.

7. A method of controlling a power propulsion unit of hybrid type for a four-wheel drive motor vehicle including at least one electric motor member and at least one combustion engine member to drive independent front and rear driven axles of the vehicle, comprising:

determining a total torque setpoint based on demands of a driver, including a selection made between four-wheel drive operation and operation that minimizes fuel consumption;

imposing a rear torque setpoint as a function of the demands of the driver and of driving conditions;

splitting the total torque setpoint between the at least one electric motor member and the at least one combustion engine member, the splitting including imposing a dynamically variable non-zero rear torque setpoint when the four-wheel drive operation is demanded and imposing a rear torque setpoint that optimizes fuel consumption when the operation that minimizes fuel consumption is demanded; and determining a gearbox ratio and operating and torque setpoints for the engine member and the at least one electric motor member so as to optimize operation of the power propulsion unit according to whether the driver is demanding the four-wheel drive operation or the operation that minimizes fuel consumption.

8. The method as claimed in claim 7, wherein the splitting includes imposing a non-zero rear torque setpoint to optimize fuel consumption when the operation that minimizes fuel consumption is demanded.

9. A system for controlling a power propulsion unit of hybrid type for a four-wheel drive motor vehicle including at least one electric motor member and at least one combustion engine member, to drive independent front and rear driven axles of the vehicle, comprising:

a determining unit configured to determine a total torque setpoint based on demands of a driver, including a selection made between four-wheel drive operation and operation that minimizes fuel consumption;

a vehicle course and stability control unit configured to impose a rear torque setpoint as a function of the demands of the driver and of driving conditions;

a splitting unit configured to split the total torque setpoint between the at least one electric motor member and the at least one combustion engine member, the splitting unit imposing a dynamically variable non-zero rear torque setpoint when the four-wheel drive operation is demanded and imposing a rear torque setpoint that optimizes fuel consumption when the operation that minimizes fuel consumption is demanded; and an optimizing unit configured to optimize an operating point of the power propulsion unit according to the demands by the driver and driving conditions.

10. The system as claimed in claim 9, wherein the splitting unit imposes a non-zero rear torque setpoint to optimize fuel consumption when the operation that minimizes fuel consumption is demanded.

* * * * *